Figure 1:
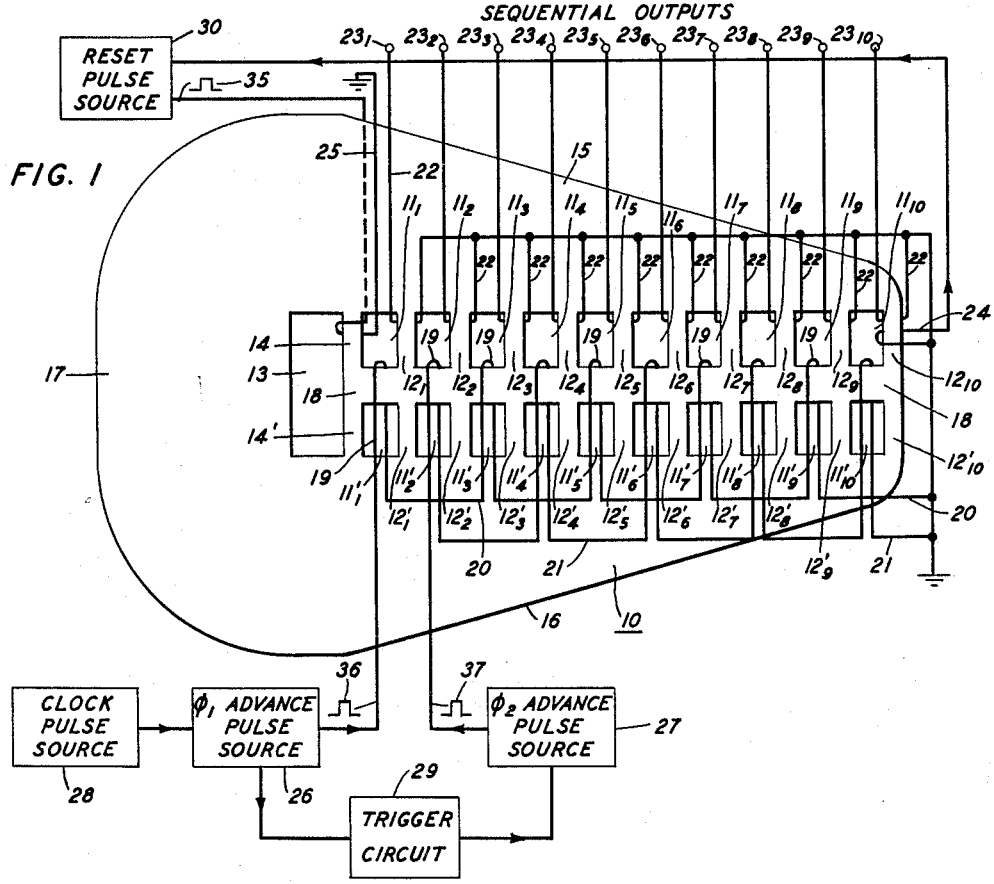

Jan. 14, 1964   U. F. GIANOLA   3,118,070
ELECTRICAL CONTROL CIRCUITS
Filed Aug. 18, 1959   2 Sheets-Sheet 1

NORMAL FLUX PATTERN

INVENTOR
U. F. GIANOLA
BY
*William H. Kamstra*
ATTORNEY

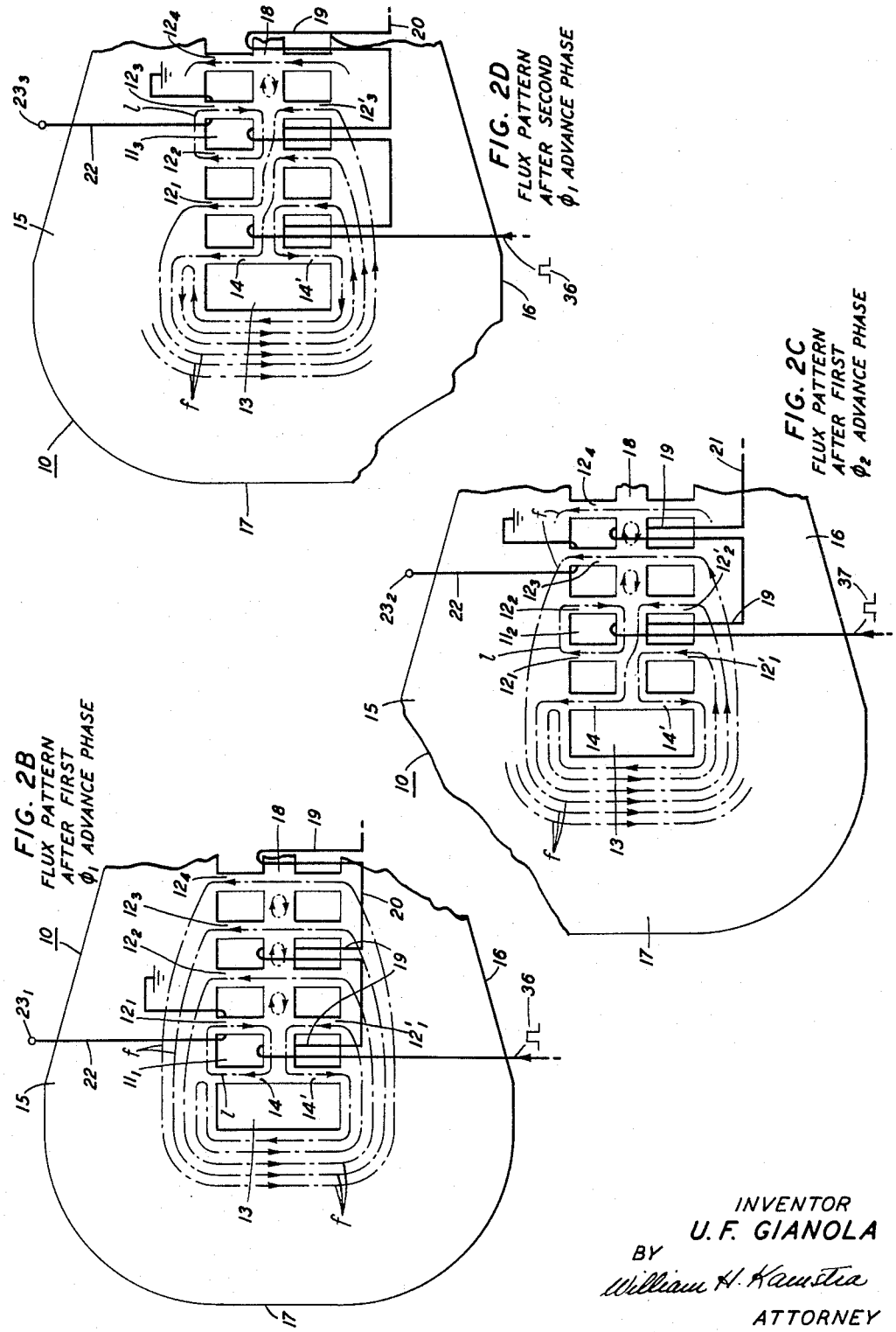

3,118,070
ELECTRICAL CONTROL CIRCUITS
Umberto F. Gianola, Florham Park, N.J., assignor to Bell Telephone Laboratories, Incorporated, New York, N.Y., a corporation of New York
Filed Aug. 18, 1959, Ser. No. 834,603
9 Claims. (Cl. 307—88)

This invention relates to electrical control circuits and particularly to electrical control circuits in which output pulses are generated by the selective control of flux switching in a magnetic structure.

Magnetic structures of a material exhibiting substantially rectangular hysteresis characteristics in which a unit or a pattern of flux is selectively propagated, have proven highly advantageous for the selective generation of an output signal or signals. Such structures have been adapted for use as control elements in a wide variety of applications. Their unitary constructions within the single confines of which all of the switching control may be accomplished has provided advantages in terms of economy, reliability, ease of fabrication, and the like, not hitherto attainable with more conventional magnetic elements. Such a magnetic structure is described, for example, in connection with its adaptation as a control element in a shift register arrangement in the copending application of T. H. Crowley and U. F. Gianola, Serial No. 834,587, filed August 18, 1959. In the particular arrangement there described a flux distribution pattern representative of a binary information value is successively shifted along a sequence of flux control legs defined by the magnetic structure. The successive shifts are accomplished by applying advance magnetomotive drives to the magnetic structure in a succession of advance phases of operation.

In accordance with sequential electrical switching practice, it is generally a requirement that the successive shifts of an electrical or a magnetic reference state be unidirectional for a given switching operation and also that the shifts be in discrete, measured steps. In magnetic control structures, a shift of a particular flux pattern is accomplished by making available to a switching flux a limited closure path or paths in a forward direction while denying closure to the switching flux through unselected backward paths. Obviously to insure the propagation of a magnetic flux pattern in a required direction each and every closure path, in the undesired direction must be rendered unavailable. In some sequential magnetic control arrangements a rigid control is exercised over the entire flux distribution in the structure by multiplying the number of advance phases. By this means the extent of the flux affected by each advance drive is restricted; however, in such a case the additional wiring and power supplies necessitated complicate the circuitry and obviously add to the cost of fabrication.

In other known arrangements where a unit of flux is successively switched to realize a sequential operation mispropagation in undesired directions may present little difficulty. The required propagation may be achieved in such an arrangement by means of a single advance phase. However, control must still be rigidly maintained over the switching flux to prevent a propagation beyond the particular point in the structure corresponding to the step of the sequence of operation being taken. This control is achieved in one known magnetic sequential arrangement described in the copending application of E. E. Newhall, Serial No. 818,130, filed June 4, 1959, by carefully limiting the magnetomotive drives causing the flux propagation steps. As an output signal is generated by a discrete flux step, the latter signal is employed to cut off the pulse generating means supplying the flux propagation drive. This method of operation has proved effective to control the propagation of flux in accordance with the schedule of output signals required. However, clearly additional external control circuitry is again required to achieve discrete and carefully limited magnetomotive drive steps. Thus, in this situation also an otherwise simple and effective magnetic control arrangement may be necessarily complicated and its cost increased in order to achieve positive control of the flux movement in the structure.

It is an object of the present invention to achieve a positive control of the propagation of magnetic flux in discrete steps in one direction in a magnetic flux control structure.

Another object of this invention is to provide a new and novel sequential stepping switch.

It is also an object of this invention to provide a simpler, more easily fabricated electrical control circuit in which selective flux propagation is employed as a switching means.

A still further object of this invention is to achieve a step-by-step propagation of flux in a magnetic flux control structure with a minimum number of advance phases of operation and external electrical control circuits.

Yet another object of this invention is to reduce the overall size of a magnetic flux control structure in magnetic control devices.

The foregoing and other objects of this invention are realized in one illustrative embodiment thereof comprising a magnetic structure in which a plurality of flux control legs are defined. The structure may be similar to other known structures in which a flat plate of a known square loop ferrite material is apertured to define the flux control legs. In such structures, for example, as employed in the shift register arrangement of the copending application of T. H. Crowley and U. F. Gianola cited hereinbefore, a single sequence of apertures forms a generally ladder-like configuration with the control legs constituting the transverse rungs. A plurality of single flux paths are thus presented by the flux legs, each one of which may comprise part of a flux loop closed through the side rails of the structure and any one or more of the other flux legs. In accordance with the principles of the present invention, a structure is contemplated in which a double row of apertures following in sequence a single, larger aperture, define a first and a second plurality of flux control legs arranged in parallel, corresponding rows. In each row of flux control legs so resulting, a plurality of single flux paths are again presented. However, instead of comprising parts of simple flux loops closed immediately through side rails of the structure, it is apparent that a flux in a flux path presented by a leg of one row may be linked to a flux in any one of the flux paths presented by the legs of the other row. The possibility of linking one flux path of one row with a flux path other than the corresponding one of the other row is advantageously employed in the present invention to achieve a propagation of flux in only a forward direction when driven by a maximum of two advance phases.

According to one feature of this invention a magnetic structure is apertured to define a single common flux return path for flux in possible combinations of flux paths defined by a first and a second plurality of flux-limited flux control legs. A normal remanent flux distribution in the structure has each of the flux control legs of each row except the first legs of the rows remanently flux saturated in one direction, the flux in each leg of one row being linked to the flux in the corresponding leg of the other row. A remanent "set" flux is also linked together in the opposite direction through the first legs of the two rows of legs. The flux in the two rows of legs, in either direction, then is closed in loops through the common flux return path.

It is another feature of this invention that a pair of advance circuits include advance windings, each of which is threaded through a pair of the apertures defining corresponding legs of the two rows of legs. The advance windings of each advance circuit alternate in threading the two sequences of apertures to accomplish the application of the two alternating advance magnetomotive drives. When a first advance current pulse is applied to one of the advance circuits a flux reversal is caused to occur and a switching flux induced, in a closed flux loop defined by the first and second flux control legs of one of the rows of legs. During the next and subsequent applications of alternating advance current pulses applied to the two advance circuits, the closed flux loop comprising the single loop of switching flux is successively shifted along the legs of one of the rows of legs. Output windings coupled to each of the latter legs are sequentially energized as the flux in the coupled legs is successively switched to generate a sequence of output pulses.

According to a further feature of this invention, the magnetic structure is left in its normal flux distribution behind each shift of the switching flux loop with the exception of the direction of the flux in the first flux leg of the row of legs being considered. In view of this simple deviaton from the normal flux distribution after the completion of a sequence of operation, that is, when the switching flux loop has traversed the length of the structure a single reset winding coupled to the first leg of the one row of legs in question provides a ready means for completing the normal flux restoration. Advantageously, the reset winding may be energized responsive to the flux switching in the last leg of the latter row which also results in the generation of a last output signal in the sequence of signals generated. The circuit may thus be prepared for the immediate initiation of another cycle of operation.

It is an important feature of this invention that positive control of the successive steps of switching flux is provided by the two advance phases of operation and the complete saturation of all possible flux paths in the backward direction before each forward shift. Thus, by inducing at each step a switching flux around a loop partially defined by a pair of adjacent flux legs of one of the row of legs, the remainder of the flux distribution in the structure is rearranged to completely saturate the possible flux paths in a backward direction. This is accomplished by means of a flux linking member separating the two rows of apertures in the magnetic structure, which member provides a closure and linking path for each of the possible flux paths defined in the structure. When closure paths for flux in the legs of one row are denied through the corresponding legs of the other row, the flux linking member provides alternate paths along which the flux in the pairs of legs may find closure. According to the principles of this invention, the provision of such alternate paths is utilized to completely saturate the flux linking member in a direction opposite to that from that in which flux is being propagated. This is carried out when, after a stepping operation, the remanent flux in the legs of a row, instead of finding closure through the corresponding leg of the other row of legs along which a switching flux is being shifted, then closes via the flux linking member through preceding legs of the latter row. The latter closures completely saturate the flux linking member thus blocking it to further flux in the backward direction. The problem of backward propagation is thus advantageously met without substantially increasing the amount of circuit wiring and without the necessity of providing a multiplicity of current pulse sources.

This invention together with the above and other objects and features will be better understood from a consideration of the detailed description of one illustrative embodiment thereof which follows when taken in conjunction with the accompanying drawing in which:

FIG. 1 is a circuit diagram of one illustrative sequential stepping switch according to the principles of this invention in which the magnetic control structure is shown in plain view; and FIGS. 2A, 2B, 2C, and 2D are partial views of the magnetic control structure of FIG. 1 showing representative flux distribution patterns during various operative stages.

The organization and structure of a specific illustrative stepping switch according to this invention may be described with particular reference to FIG. 1 of the drawing. The circuit there shown comprises a magnetic flux control structure 10 having a plurality of apertures therein arranged in a double row. The structure 10 may be fabricated of any well-known ferrite or other material displaying substantially rectangular hysteresis characteristics. A first row of apertures $11_1$ through $11_{10}$ define therebetween a first row of flux control legs $12_1$ through $12_{10}$. A second row of apertures $11'_1$ through $11'_{10}$ define therebetween a second row of flux control legs $12'_1$ through $12'_{10}$. In addition to the two rows of apertures, which are disposed substantially parallelly, a single, larger aperture 13 defines between it and the first apertures $11_1$ and $11'_1$ of the two rows, a first and a second set leg 14 and 14'. The portions of the structure 10 bounding the apertures 11, 11', and 13 form a pair of tapered side rails 15 and 16 and a common flux return leg 17. The two rows of apertures 11 and 11' form therebetween and are separated by, a flux linking rail 18. In the structural arrangement so far described, a plurality of flux paths are presented through the legs of one of the row of legs and the corresponding legs of the other row of legs, each of the flux paths comprising a portion of a flux loop closed through the common flux return leg 17 and the side rails 15 and 16. The relative dimensions of the side rails 15 and 16, the return leg 17, and the linking rail 18 are determined in accordance with one of the principles of this invention in that paths of only sufficient flux capacity are provided to present closure paths for saturation flux in each of the aforementioned flux paths through the legs 12 and 12' and 14 and 14'. Thus, specifically, assuming each of the legs of the two rows of legs has a minimum cross-sectional area permitting one unit of flux saturation therein, the common flux return leg and the common portions of the side rails 15 and 16 each has a minimum cross-sectional area equal at least to the sum of the minimum cross-sectional areas of the legs of one row of legs. The linking rail 18, on the other hand, presents at each point along its length a minimum cross-sectional area permitting closure therethrough of two of the assumed units of flux. All of the possible single flux paths by means of which control is achieved in the structure 10 are thus substantially equally flux limited and the remaining flux paths are flux limited to the extent that they provide closure paths for the flux in the single flux paths. As a result when all of the possible flux paths are remanently flux saturated in a particular direction, no appreciable further flux can be induced in the structure 10 by applied magnetomotive forces in the particular direction. Additionally, no switching flux can be induced unless a closure path for the latter flux is available somewhere in the structure 10. Since the number of flux loops being completed through paths defined by corresponding legs of the two rows of legs diminishes in the direction away from the common return leg 17, the side rails 15 and 16 may conveniently be tapered to reduce the overall size of the structure 10.

Threaded through each aperture 11 and 11' of the corresponding pairs of apertures and about the portion of the flux linking rail 18 separating the latter aperture pairs, is an advance winding 19. In each case the winding passes through an aperture 11' from one side of the structure 10 and returns to the same side through an aperture 11. The advance windings 19 are alternately serially connected in a pair of advance circuits 20 and 21 each of which is connected at one side to ground. The flux legs $12_1$ through $12_{10}$ have coupled thereto respectively, a plurality of sequential output windings 22 which terminate at one end respectively in a plurality of output terminals $23_1$ through $23_{10}$. A reset output winding 24 is additionally coupled to the last flux leg $12_{10}$, one end of which reset winding is connected to ground as is also the other end of each of the sequential output windings 22. A reset input winding 25, one end of which is grounded, is coupled to the set leg 14 and to the common flux loop portion of the side rail 15. The sense of each of the foregoing windings is determined by the polarity of the energizing pulses to be applied and by the direction of the flux changes occurring during operative stages of the circuit and will be described with greater particularity hereinafter.

The advance circuit 20 and the advance circuit 21 are connected respectively to a $\Phi_1$ and a $\Phi_2$ advance pulse source 26 and 27. Timing control of the latter sources may be accomplished in any suitable manner as may be dictated by the requirements of the system in which the present invention may be adapted for use. One exemplary such arrangement is shown in FIG. 1 in which the basic timing is provided by periodic clock pulses supplied by a clock pulse source 28. The clock pulses determine the energization of the $\Phi_1$ advance pulse source 26 which in turn may control, after a suitable interval determined by a trigger circuit 29, the subsequent energization of the $\Phi_2$ advance pulse source 27. The timing control will obviously be determined by the required period of the sequential outputs to be generated and other control arrangements will readily occur to one skilled in the art. The other end of the reset output winding 24 is connected to a reset pulse source 30 which is energized responsive to output signals generated as the result of flux switching occurring in the last flux leg $12_{10}$. The output of the reset pulse source 30 is connected to the other end of the reset input winding 25.

The pulse sources 26, 27, 28, and 30 and the trigger circuit 29 are described herein only in terms of the function performed and the polarity and magnitude of the pulses generated. Since they comprise well-known circuit components readily devised by one skilled in the art a detailed description of these elements is not required for a full and complete understanding of the principles and organization of the present invention.

Figure 2A:
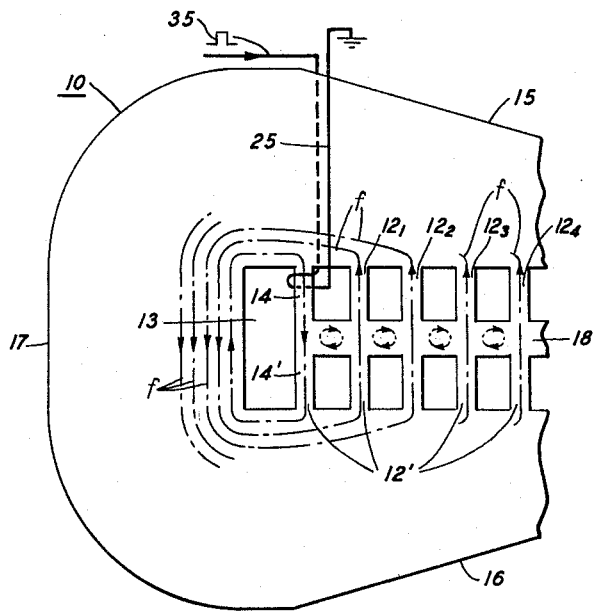

With the foregoing organization of a specific stepping switch according to this invention in mind, an illustrative operation may now be described. As initial normal flux distribution pattern in the structure 10 is graphically represented in FIG. 2A by the broken lines $f$ on a segment of a structure 10. In accordance with the normal flux distribution pattern, each of the flux legs 12 and 12' shown and each of the latter legs not shown in FIG. 2A is remanently saturated upward as viewed in the drawing and the flux in each of the legs 12 and 12' is linked through the flux linking rail 18. The set legs 14 and 14' each has a saturation flux therein in the downward direction as viewed in the drawing. The flux in each of the legs 12, 12', 14, and 14' is understood as being closed through a flux path defined by the side rails 15 and 16 and the common flux return leg 17 as partially depicted in FIG. 2A. This normal flux distribution pattern is insured before each cycle of operation by the energization of the reset input winding 25. A positive pulse 35 applied from the reset pulse source 30 is of a polarity, in view of the sense of the coupling of the winding 25 on the leg 14, such that the magnetomotive force developed switches the flux in the clock-wise direction about the aperture 13 as viewed in the drawing. In addition, the winding 25 is also coupled to the common portion of the side rail 15. As a result, the latter coupling insures the normal direction of flux in each of the remaining closed loops passing through this normal portion of the side rail 15. This latter normal direction, which is opposite to that of the loop including the legs 14 and 14', is also restored after each operative step of the circuit as will be described hereinafter. The reset operation with respect to the latter flux loops thus merely acts as a safeguard, after the normal flux distribution pattern has been initially established, to insure a complete and positive restoration of the normal pattern prior to each cycle of operation. Since the flux linking rail 18 is dimensioned to present a minimum cross-sectional area having a flux capacity equal to twice that of each of the flux legs 12, 12', 14, and 14', a magnetic neutrality may be represented therein by closed flux loops between each of the linking fluxes through the corresponding legs 12 and 12'.

The circuit is now prepared for the application of a first $\Phi_1$ advance phase of operation and the resulting generation of a first of a sequence of output signals. Responsive to a clock pulse supplied by the clock pulse source 28, the $\Phi_1$ advance pulse source 26 is energized to provide a positive current pulse 36. The pulse 36 is applied to the advance circuit 20 during the $\Phi_1$ advance phase and is limited in magnitude with respect to the number of turns of each of the advance windings 19 such that a magnetomotive force is developed by each of the latter windings sufficient to cause a flux switching only around single ones of the apertures 11. That is, a flux switching can be caused by an energized advance winding 19 only between adjacent legs 12 between which the winding 19 is coupled to the structure 10. During the $\Phi_1$ advance phase the energized advance windings 19 coupled through alternating apertures other than through the first aperture $11_1$ can accordingly cause no flux switching for the reason of this limited applied advance drive. Thus, for example, referring to FIG. 2B, it is evident by inspection that the energization of the advance winding 19 coupled between the flux legs $12_2$ and $12_3$ can cause no flux switching between the latter legs. The leg $12_2$ is already saturated in the direction in which the limited $\Phi_1$ advance pulse 36 applies a drive magnetomotive force. The flux in the leg $12_3$ is in the direction to be switched by the latter drive; however, the nearest closure path for such a flux switching would be through the leg $12_1$. In accordance with the limitation imposed, the magnitude of the applied drive is insufficient to cause such a switching through the leg $12_1$ with the result that the flux in the legs $12_2$ and $12_3$ remains changed during this stage of the $\Phi_1$ advance phase. In a similar manner, it may be demonstrated that the energized advance windings 19 coupled between further flux legs 12 also can cause no flux switching between these legs at this time.

The normal flux in the adjacent legs 14 and $12_1$, however, being oppositely directed, may be switched at this time by the advance pulse 36 being applied to the advance winding 19 coupled therebetween. Thus, specifically, as this switching occurs a closed loop of flux may be understood as resulting about the aperture $11_1$. This loop is represented in the drawing by the broken line $l$. Since the flux linking rail 18 has a capacity of two of the units of flux assumed for purposes of description, the flux originally present in the lower legs 14' and $12'_1$ is readily linked in the manner represented in FIG. 2B. In a similar manner the flux originally closed about the aperture 13 may be linked to close upon itself in the common portion of the side rail 15 also as represented in FIG. 2B. As a complete reversal of flux occurs in the leg $12_1$ a first of a sequence of output signals is induced in the output winding 22 coupled to that leg and is made available at the output terminal $23_1$ of the latter winding. The polarity of the output signal so generated obviously may be adjusted in accordance with the requirements of the system with which the present invention is adapted for use simply by adjusting the sense of the winding 22 as is known. The generation of the first output signal and a first $\Phi_1$ advance phase of operation of the illustrative stepping switch of FIG. 1 has thus been completed.

The $\Phi_1$ advance pulse source 26, in addition to providing the $\Phi_1$ advance pulse 36 also provides an output for energizing the trigger circuit 29. The latter circuit, after an interval determined by its circuit parameters in accordance with the period of the sequential output signals desired, triggers the $\Phi_2$ advance pulse source 27 to initiate the first $\Phi_2$ advance phase of operation. The advance pulse source 27 generates an advance pulse 37, which, for the reasons previously explained, is also limited in magnitude with respect to the number of turns of the advance windings 19 such as to develop a magnetomotive force sufficient only to cause flux switching between adjacent legs 12 of the structure 10. The advance pulse 37 is applied during the $\Phi_2$ advance phase to the advance circuit 21 and thereby to its serially connected advance windings 19. For the reasons previously described, and in accordance with the advance drive limitation imposed, no flux switching can be caused by the advance pulse 37 between adjacent legs 12 with the exception of the legs $12_1$ and $12_2$. In each of the blocked cases, either one leg is already saturated in a direction to which it is being driven or no closure paths of sufficiently low reluctance are available for the switching flux. In the case of the presently oppositely saturated legs $12_1$ and $12_2$, however, a closure path for the switching flux is presented about the aperture $11_2$. The flux in the legs $12_1$ and $12_2$, as a result, switches, thereby shifting the closed flux loop $l$ from around the aperture $11_1$ to the aperture $11_2$. This flux switching and shift of the closed flux loop is represented in FIG. 2C. The resulting reversal of flux in the flux leg $12_2$ again induces an output signal in the output winding 22 coupled to the latter leg. This output signal, of a polarity determined by the sense of the winding 22, is made available at the output terminal $23_2$ as a second of the sequence of signals being generated. Flux closures in the structure 10 as a result of the first $\Phi_2$ advance phase may be understood as depicted in FIG. 2C. It may be noted that the flux in the lower legs $14'$ and $12'_1$ remains unchanged after the $\Phi_2$ advance phase. However, the flux in the lower leg $12'_2$ as a result of the flux reversal in the upper leg $12_2$, has been deprived of a closure path through the latter leg. Accordingly, a new path must be found and this is readily presented through the partially saturated flux linking rail 18 and the upper set leg 14. A flux linkage thus is set up between the flux in the lower leg $12'_2$ and the upper leg 14. At this point no problem of back propagation of flux would as yet have been presented since the flux loop pattern $l$ being sequentially shifted has traversed only through its first two positions.

At the completion of the first $\Phi_2$ advance phase and the generation of a second of the sequence of output signals, a clock pulse from the clock pulse source 28 again energizes the $\Phi_1$ advance pulse source 26. As a result, a second limited advance pulse 36 is applied to the advance circuit 20. At this time again the limited magnetomotive force developed by the energized advance winding 19 coupled to the structure 10 between the legs 14 and $12_1$ cannot cause a flux reversal between the latter legs. Thus, as previously described, flux switching is prevented in the only leg with respect to the first advance winding 19 which has a flux therein in a direction opposite to that of the applied drive. Any flux switching in the latter leg, that is, the leg $12_1$, would have a closure path of a reluctance beyond the force of the applied advance drive. Flux switching behind the aperture $11_3$ around which the shifting flux loop pattern $l$ is closed is thus effectively precluded to positively meet the problem of back propagation. In a similar manner and as previously described, flux switching beyond the aforementioned flux pattern is also effectively prevented because either the paths are already saturated closure paths or the paths are too distant for the drive being applied. Thus during the advance phase being described, the flux in the leg $12_4$ also remains unchanged in direction. The advance current pulse 36 now being applied in the second $\Phi_1$ advance phase to the advance winding 19 coupled to the structure 10 between the legs $12_2$ and $12_3$, however, is able to effect a flux reversal between the latter legs. As a result, the flux in the leg $12_2$ is restored to the normal direction and the flux in the leg $12_3$ is switched to a set condition. The latter flux finds closure by linking with the restored flux in the leg $12_2$ to form a loop $l$ about the aperture $11_3$. The flux reversal in the leg $12_3$ induces an output signal in the output winding 22 coupled thereto, which output signal is made available at the terminal $23_3$ as the third in the sequence of output signals being generated. The flux closures and linkages resulting from the second $\Phi_1$ advance phase are depicted in FIG. 2D.

The flux loop pattern $l$ about the aperture $11_2$ has in this manner been propagated along the structure 10 to the aperture $11_3$ during the second $\Phi_1$ advance phase. The flux in the leg $12_1$ forming a part of the shifting flux loop in the previous advance phase, is now denied closure through the path then assumed. Accordingly a new closure path may be found by a linkage, via an only partially saturated portion of the flux linking rail 18, with the flux in the same direction in the lower leg $12'_3$. By thus progressively saturating the flux linking rail 18 behind the propagating flux loop pattern $l$ in this manner, closure for any possible switching flux in the direction opposite to that in which flux is being propagated is effectively precluded. Flux switching beyond the flux pattern being propagated is also prevented by the unavailability of closure or linkage paths as described in detail hereinbefore. By just two advance phases of operation a positive control of the measured shifts of the flux loop pattern is thus advantageously afforded.

As the advance circuits 20 and 21 are alternately successively energized by the applied advance pulses 36 and 37, respectively, during subsequent advance phases of operation, the flux loop pattern $l$ is successively shifted along the remainder of the structure 10 in the manner described for the first three such shifts in the foregoing. During subsequent shifts the flux reversals in the legs 12 induce output signals in the coupled output windings 22 which appear on the remaining terminals $23_4$ through $23_{10}$ to complete the sequence of output signals being generated. It may be noted and an inspection of FIGS. 2A through 2D will reveal that the legs 12 so far discussed are restored to their normal flux condition after each shift step. With the exception of the leg $12_{10}$ the structure 10 will be in the normal flux distribution preparatory to the immediate initiation of another cycle of operation when the last of the sequence of output pulses has been generated in the flux leg $12_{10}$. However, the latter leg together with the set leg 14 and the flux linking rail 18 are not so automatically restored and a reset phase with respect to these members is provided. Accordingly, simultaneously with the generation of the last output signal of the sequence, that is, when the last leg $12_{10}$ is set, a reset output signal is induced in the reset output winding 24 coupled to the last flux leg $12_{10}$. This reset output signal is utilized to energize the reset pulse source 30 before the occurrence of the next periodic clock pulse from the clock pulse source 28 and therefore the re-energization of the $\Phi_1$ advance pulse source 26. The reset pulse source 30 provides a reset input signal 35, previously referred to, which latter signal is applied to the reset winding 25 coupled to the set leg 14. The magnetomotive force developed thereby resets the flux in the latter leg and the leg $12_{10}$ and the original loop about the aperture 13 is also restored by the resulting flux linkage. Closure paths are also, as a result, again made available for the similarly directed fluxes in the corresponding legs of the two rows of flux legs 12 and $12'$. Thus, as a result of the applied reset input signal 35, a complete restoration of the flux distribution state in the structure 10 to that depicted in FIG. 2A is accomplished. By the additional coupling of the reset winding 25 to the common portion of the side rail 15, the normal flux distribution pattern is initially established before a first operation of the circuit and the proper direction and complete saturation of flux in each of the legs 12 and 12' is insured after each subsequent cycle of operation. Possible spurious flux traversals resulting from extraneous fields developed in the system with which the present circuit may be adapted for use, are thus also safeguarded against. Upon the completion of the reset phase the circuit is again fully prepared for another cycle of operation and the generation of another sequence of output signals.

In addition to the sequence of output signals above-described which are generated as the legs 12 are flux-switched, an alternating sequence of output signals of the opposite polarity is also generated in the output windings 22 as the latter legs are restored to their normal flux direction. Obviously either or both of the alternating sequence of output pulses may be utilized in a system application. Where a sequence of signals of a particular single polarity are required, suitable unidirectional circuit elements may be employed to accomplish a selection between the bi-polar signals generated.

In the foregoing description of an illustrative cycle of operation of the circuit of FIG. 1, specific and detailed flux closures and linkages have been assumed and their loops traced. It should be understood, however, that the particular flux rearrangements suggested have been provided only to present a consistent and workable explanation of the flux behavior within the confines of the structure 10 at various operative stages. The actual physical behavior of the magnetic domains within the structure 10 may be considerably more complex. However, a theoretic explanation of such behavior lies outside of the scope of this invention and is further not required for a full and complete understanding of its principles and organization. Thus, other flux paths may be traced and other closure loops may be postulated with equal validity to achieve a workable description of this invention. The conditions imposed on any explanation reside merely in maintaining the relative flux-limited capacities of the various structural members and the relative polarities of the remanent fluxes stated to be present therein.

The illustrative embodiment of this invention described produces a sequence of ten output signals during each complete cycle of operation. It will be readily apparent to one skilled in the art, however, that by simply providing additional legs 12 and 12' to the structure 10, a sequence of any number of output signals may be achieved during an operative cycle. A novel electrical stepping switch having a wide variety of applications is thus presented, which switch has minimum power requirements while still maintaining a positive control of the flux propagation accomplishing the switching function. A circuit according to the principles of this invention advantageously finds application as a synchronous sequential logic device, for example. In such an application the logic inputs may be introduced in alternating phases and comprise the advance drives. The logic function may then be generated in the form of a particular timing of the sequential outputs on the terminals $23_1$ through $23_{10}$.

What has been described is considered to be one specific illustrative embodiment of this invention. It is to be understood that various and numerous other arrangements may be devised by one skilled in the art without departing from the spirit and scope of this invention.

What is claimed is:

1. An electrical circuit comprising a magnetic structure having a substantially rectangular hysteresis characteristic, said structure having a first and a second row of first apertures therein defining a first and a second row of corresponding flux control legs, said rows of apertures also defining a flux linking rail therebetween, said structure also having a second aperture therein defining a set flux leg in each of said rows of flux control legs and a common flux return leg; inductive means for establishing a set flux around said second aperture and through said set flux legs in one direction and a normal flux around said second aperture and through each of the corresponding legs of said first and said second flux control legs in the opposite direction, a plurality of advance windings each coupled to said flux linking rail through corresponding apertures of said first and second row of first apertures, a first advance circuit connecting alternating first ones of said advance windings in series, a second advance circuit connecting alternating second ones of said advance windings in series, means for shifting said set flux along the flux legs of one of said rows of legs comprising means for alternately applying advance pulses to said first and said second advance circuits, and an output winding coupled to each of said last-mentioned flux legs.

2. An electrical circuit as claimed in claim 1 also comprising a reset output winding energized responsive to a flux reversal in a last of said last-mentioned legs for generating a reset output signal, and means operated responsive to said reset output signal for energizing said inductive means.

3. An electrical control circuit comprising a magnetic structure of a material having a substantially rectangular hysteresis characteristic, said structure comprising a first and a second plurality of flux control legs, a common flux return leg, first magnetic means for completing flux paths between one end of each leg of said first and said second plurality of flux control legs and said common flux return leg, and second magnetic means for completing flux paths between the other end of each leg of said first plurality of flux control legs and the other end of each leg of said second plurality of flux control legs; a plurality of advance windings each coupled to said second magnetic means between adjacent legs of said first and said second plurality of flux control legs, a first advance circuit connecting alternating first ones of said advance windings in series, a second advance circuit connecting alternating second ones of said advance windings in series, means for alternately applying advance pulses to said first and said second advance circuits, and a plurality of output windings coupled respectively to selected legs of said first plurality of flux control legs.

4. An electrical control circuit as claimed in claim 3 also comprising a reset output winding coupled to a last of said last-mentioned legs, a reset input winding coupled to a first of said last-mentioned legs, and means energized responsive to output signals on said reset output winding for applying reset pulses to said reset input winding.

5. An electrical control circuit as claimed in claim 4 in which the minimum cross-sectional areas of the legs of said first and said second plurality of flux control legs are substantially equal and the cross-sectional area of said second magnetic means is substantially twice the minimum cross-sectional area of one of said legs.

6. An electrical control circuit comprising a magnetic structure comprising a flux linking rail having a first and a second plurality of corresponding flux control legs oppositely extending therefrom, a common flux return leg, and magnetic means for completing flux paths through each of said first and said second plurality of flux control legs and said return leg, each of said first and said second plurality of flux control legs being of a material having susbtantially rectangular hysteresis characteristics, inductive means including a reset input winding coupled to a first leg of said first plurality of flux control legs and said magnetic means for inducing a set flux in one direction in the first leg of said first and said second plurality of flux control legs and a normal flux in the opposite direction in each of the remaining legs of said first and said second plurality of flux control legs, means for shifting said set flux along the legs of said first plurality of flux control legs comprising a first advance circuit means including a pulse source and a first plurality of advance windings coupled to said flux linking rail between alternating first adjacent ones of said first plurality of flux control legs and a second advance circuit means also including a pulse source and a second plurality of advance windings coupled to said flux linking rail between alternating second adjacent ones of said first plurality of flux control legs; and a plurality of output windings coupled respectively to said remaining legs of said first plurality of flux control legs, said output windings being energized responsive to the shifting of said set flux along said last-mentioned legs for providing a sequence of output signals.

7. An electrical control circuit as claimed in claim 6 also comprising reset control means comprising a reset output winding coupled to the last leg of said first plurality of flux control legs energized responsive to a flux reversal in said last-mentioned leg for providing a reset output signal and a reset pulse source energized responsive to said reset output signal for applying a reset input signal to said reset input winding.

8. An electrical control circuit as claimed in claim 7 in which the flux capacity of the legs of said first and said second plurality of flux control legs is substantially the same and the flux capacity of said flux linking rail is substantailly twice that of one of said legs.

9. A magnetic control device comprising a magnetic plate of a material having a substantially rectangular hysteresis characteristic, said plate having a plurality of first apertures therein defining a plurality of flux control legs, a plurality of second apertures therein defining a plurality of flux closing legs, and a single third aperture therein defining a flux return leg with a side of said plate and a first and a second set leg with a first of said plurality of first apertures and a first of said plurality of second apertures, said plurality of first and second apertures also defining therebetween a flux linking rail, means for establishing a set flux in one direction about said third aperture in said first and second set legs and a normal flux in the opposite direction about said third aperture in each leg of said plurality of flux control legs and in each leg of said plurality of flux closing legs, a first plurality of advance windings threading alternating corresponding first ones of said first and second plurality of apertures, a second plurality of advance windings threading alternating corresponding second ones of said first and second plurality of apertures, a first advance circuit connecting said plurality of first advance windings in series, a second advance circuit connecting said plurality of second advance windings in series, means for shifting said set flux along said plurality of flux control legs comprising means for alternately applying advance pulse to said first and second advance circuits, each of said advance pulses being of a magnitude with respect to the number of turns of each of said advance windings to cause a flux reversal only between adjacent one of said plurality of flux control legs, and an output winding coupled to each of said flux control legs energized responsive to flux reversals in said last-mentioned legs as said set flux is shifted along for generating a sequence of output signals.

References Cited in the file of this patent
UNITED STATES PATENTS
2,951,245    Kihn _____ Aug. 30, 1960

OTHER REFERENCES
Publication: "IBM Technical Disclosure Bulletin"; vol. 1, No. 2, August 1938.